US009832299B2

(12) United States Patent
Kim

(10) Patent No.: US 9,832,299 B2
(45) Date of Patent: Nov. 28, 2017

(54) BACKGROUND NOISE REDUCTION IN VOICE COMMUNICATION

(71) Applicant: Empire Technology Development LLC, Wilmington, DE (US)

(72) Inventor: Seungil Kim, Seoul (KR)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 330 days.

(21) Appl. No.: 14/377,388

(22) PCT Filed: Jul. 17, 2013

(86) PCT No.: PCT/US2013/050863
§ 371 (c)(1),
(2) Date: Aug. 7, 2014

(87) PCT Pub. No.: WO2015/009293
PCT Pub. Date: Jan. 22, 2015

(65) Prior Publication Data
US 2016/0198030 A1    Jul. 7, 2016

(51) Int. Cl.
*H04M 1/19*    (2006.01)
*G10K 11/178*    (2006.01)
*G10L 21/0216*    (2013.01)

(52) U.S. Cl.
CPC .......... *H04M 1/19* (2013.01); *G10K 11/178* (2013.01); *G10L 21/0216* (2013.01); *G10K 2210/108* (2013.01); *G10K 2210/1081* (2013.01); *G10K 2210/3014* (2013.01); *G10K 2210/30231* (2013.01)

(58) Field of Classification Search
None
See application file for complete search history.

(56) References Cited

U.S. PATENT DOCUMENTS

| 8,965,005 | B1* | 2/2015 | Gopalakrishnan | H04M 1/19 381/94.1 |
| 9,288,594 | B1* | 3/2016 | Polansky | G10L 19/00 |
| 2005/0108004 | A1* | 5/2005 | Otani | G10L 25/78 704/205 |

(Continued)

FOREIGN PATENT DOCUMENTS

EP    1531605 A1    5/2005

OTHER PUBLICATIONS

International Search Report and Written Opinion for International Application No. PCT/US13/50863, mailed on Jan. 24, 2014.

*Primary Examiner* — Fan Tsang
*Assistant Examiner* — Jeffrey Lytle
(74) *Attorney, Agent, or Firm* — Brundidge & Stanger, P.C.

(57) ABSTRACT

Technologies are generally described for a noise cancellation scheme for voice communications. In some examples, a system configured to cancel background noise in voice communication may include a user device configured to capture a background sound; and a server configured to receive the background sound captured by the user device, identify a source of the background sound from among a plurality of predetermined sound sources, and generate a reference background sound based at least in part on the identified source.

18 Claims, 8 Drawing Sheets

(56) References Cited

U.S. PATENT DOCUMENTS

| | | | |
|---|---|---|---|
| 2007/0041589 A1* | 2/2007 | Patel | H04M 1/6066 |
| | | | 381/73.1 |
| 2010/0131269 A1 | 5/2010 | Park et al. | |
| 2010/0138222 A1 | 6/2010 | Herbig et al. | |
| 2010/0146445 A1* | 6/2010 | Kraut | H04N 5/60 |
| | | | 715/821 |
| 2010/0226491 A1 | 9/2010 | Conte et al. | |
| 2011/0007907 A1* | 1/2011 | Park | G10K 11/178 |
| | | | 381/71.8 |
| 2012/0052872 A1* | 3/2012 | Do | G01S 5/18 |
| | | | 455/456.1 |
| 2012/0148060 A1 | 6/2012 | Isberg | |
| 2013/0040694 A1* | 2/2013 | Forutanpour | G10L 21/0216 |
| | | | 455/550.1 |
| 2014/0133647 A1* | 5/2014 | Michaelis | H04R 3/005 |
| | | | 379/392.01 |
| 2014/0254816 A1* | 9/2014 | Kim | G10K 11/16 |
| | | | 381/71.11 |
| 2014/0316778 A1* | 10/2014 | Venkatesha | G10L 21/0202 |
| | | | 704/233 |

* cited by examiner

BACKGROUND NOISE REDUCTION IN VOICE COMMUNICATION

CROSS-REFERENCE TO RELATED APPLICATION

This Application is a U.S. National Stage filing under 35 U.S.C. §371 of International Application No. PCT/US13/50863 filed on Jul. 17, 2013.

BACKGROUND

The amount of data that can be transmitted per unit time continues to increase for high-speed wireless communication services. As just one result, the demand for high-quality voice communication services continues to grow, as well. For example, HD (high-definition) voice or wideband voice services provide a user with greater clarity and a better audio experience in VoIP communications. HD voice services employ a wideband codec to double the sampling rate compared to conventional voice telephony services, and further use DSP (digital signal processing) technologies to capture and transmit the higher quality sound. Such advanced technologies add significant depth and nuance to transmitted sounds while reducing the bandwidth requirement to half that of PSTN transmission.

SUMMARY

In an example, a system configured to cancel background noise in voice communication may include a user device configured to capture a background sound; and a server configured to receive the background sound captured by the user device, identify a source of the background sound from among a plurality of predetermined sound sources, and generate a reference background sound based at least in part on the identified source.

In another example, a user device configured to cancel background noise in voice communication may include a sound detector configured to capture a background sound; a transmitter configured to transmit the captured background sound to a server; a receiver configured to receive, from the server, a reference background sound corresponding to the captured background sound; and a noise canceller configured to cancel the background sound in the voice communication based at least in part on the reference background sound.

In yet another example, a server may include a receiver configured to receive a background sound from a user device; a sound retrieval unit configured to identify a source of the background sound from among a plurality of predetermined sound sources; a reference sound generation unit configured to generate a reference background sound based at least in part on the identified source; and a transmitter configured to transmit the reference background sound to the user device.

In still another example, method for cancelling background noise in voice communication may include capturing a background sound; identifying a source of the captured background sound from among a plurality of predetermined sound sources; generating a reference background sound based at least in part on the identified sound source; and cancelling the background sound in the voice communication based at least in part on the reference background sound.

In still another example, a computer-readable storage medium may store a program for causing a processor configured to cancel background noise for voice communication, the program including one or more instructions for capturing a background sound; identifying a source of the captured background sound from among a plurality of predetermined sound sources; generating a reference background sound based at least in part on the identified sound source; and cancelling the background sound in the voice communication based at least in part on the reference background sound.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
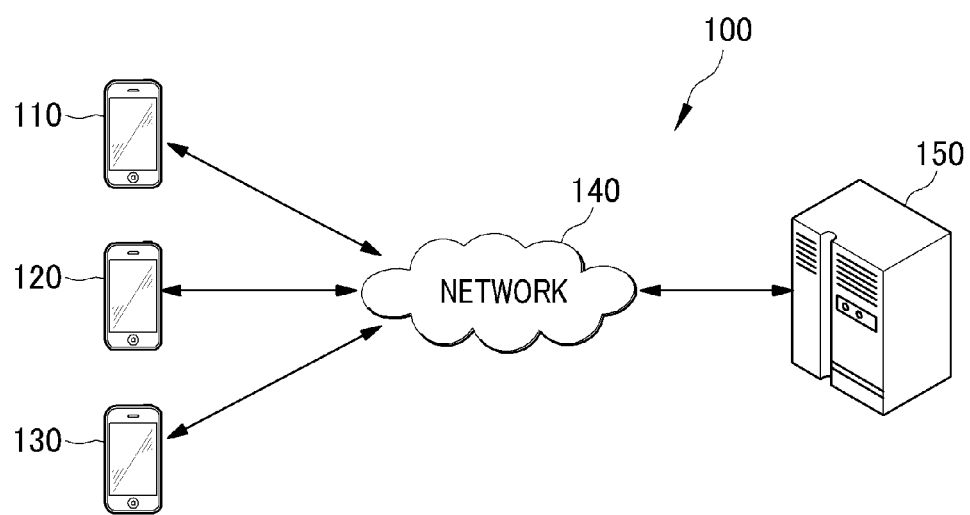
FIG. 1 schematically shows an illustrative example of a noise cancellation scheme using a reference sound generated based on a source of background sound, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a voice communication system including a user device configured to capture a background sound and a server configured to generate a reference sound for noise cancellation based on a source of the background sound. Further, technologies are herein generally described for a noise cancellation scheme for the voice communication system.

In some examples, the voice communication system may employ a noise cancellation scheme to generate a reference sound based on a source of a background sound. A user device may capture a background sound (e.g., using a sound sensor including a voice activity detector). The user device may transmit the captured background sound to a server in the form of raw sound data, compressed sound data, and/or and sound features (e.g., LPC (linear predictive coding) cepstrum coefficients, MFCCs (mel-frequency cepstrum coefficients), etc.).

In some examples, the user device may capture the background sound when a voice call request signal is received as part of an incoming call. In some other examples, the user device may capture the background sound when the user device enters a call mode as part of an outgoing call.

In some examples, the server may receive the background sound captured by the user device, and identify a source of the background sound from among a plurality of predetermined sound sources. The server may identify the source of the background sound by comparing the background sound to sounds corresponding to the plurality of predetermined sound sources, which may include comparing an audio fingerprint of the background sound to audio fingerprints of the sounds corresponding to the plurality of predetermined sound sources.

In some examples, the server may generate a reference background sound, based at least in part on the identified source of the background sound, by adjusting properties of a sound corresponding to the identified source based at least in part on properties of the background sound. The properties of the background sound may be estimated using a channel estimation technique, and/or may include at least one of a quality of sound and an impulse response.

In some examples, the user device may receive the reference background sound from the server and cancel the background sound in the voice communication, based at least in part on the reference background sound, using an adaptive noise cancellation technique (e.g., an LMS (least-mean-square) algorithm, an RLS (recursive-least-square) algorithm, etc.).

FIG. 1 schematically shows an illustrative example of a noise cancellation scheme using a reference sound generated based on a source of background sound, arranged in accordance with at least some embodiments described herein.

As depicted, in a voice communication system 100, one or more user devices 110 to 130 may communicate with each other or other user devices for transmission of speech or other sound through a network 140. Voice communication system 100 may further include a server 150 configured to generate a reference background sound for noise cancelling based on a background sound captured by any one of user devices 110 to 130, which will be described later in detail.

As referenced herein, background sound may refer to sound that may be emanated from an environment of user devices 110 to 130 or any other user devices. For example, the background sound may include background music or noise emanated from an environment such as a car audio, a restaurant, a street, etc., or voice or speech from any other persons than the users of user devices 110 to 130.

In some embodiments, user devices 110 to 130 may be any type of mobile or stationary device with voice communication capabilities including, for example, a telephone, a cellular phone, a smartphone, a personal digital assistant (PDA), a tablet, a laptop computer, a desktop computer, etc. For example, the voice communication capabilities of user devices 110 to 130 may include phone calls, video calls (e.g., Skype™), audio/video recordings, audio recognition capabilities, etc. Also, although three user devices 110 to 130 are illustrated in FIG. 1, it should be noted that the present disclosure may not be limited thereto, but also applied to any other configuration where a different number (e.g., one, two, or more than three) of user devices are arranged.

In some embodiments, network 140 may be of any type of telecommunication network including, for example, a public switched telephone network (PSTN), an integrated services digital network (ISDN), a digital subscriber line (DSL), a cellular network, a wireless wide area network (WAN), a wireless metropolitan area network (MAN), a wireless local area network (LAN), a wireless campus area network (CAN), etc. Although the below description describes that user devices 110 to 130 and/or server 150 perform several operations and/or functions in accordance with at least some embodiments, those skilled in the art will recognize that computer programs or program modules hosted by the respective entities may perform the operations and/or functions described herein.

In some embodiments, user devices 110 to 130 and server 150 may employ any suitable voice communication protocol including, for example, voice over IP (VoIP), in which voice communications and/or multimedia data are delivered over network 140. Further, one or more of user devices 110 to 130 and/or server 150 may implement a noise cancellation scheme to cancel a background sound in voice communication (e.g., speech data) using a reference background sound generated based on a background sound captured by at least a respective one of user devices 110 to 130.

In some embodiments, at least one of user devices 110 to 130 may capture a background sound (e.g., using a sound sensor including a voice activity detector) and transmit the captured background sound and/or speech data to server 150. In some of these embodiments, user devices 110 to 130 may capture the background sound when a voice call request signal is received as part of an incoming call on the respective user devices. In some others of these embodiments, user devices 110 to 130 may capture the background sound when the respective user devices enter a call mode as part of an outgoing call.

In some other embodiments, server 150 may receive the background sound and/or speech data captured by any one of user devices 110 to 130, and identify a source of the background sound from among a plurality of predetermined sound sources. Server 150 may generate a reference background sound based at least in part on the identified source of the background sound. In at least some of these embodiments, server 150 may generate the reference background sound by adjusting properties of a sound corresponding to the identified source based at least in part on properties of the background sound. The properties of the background sound may be estimated using a channel estimation technique, and/or may include an impulse response.

In still some other embodiments, any one of user devices 110 to 130 may receive the reference background sound from server 150, and cancel the background sound in the voice communication based at least in part on the reference background sound using an adaptive noise cancellation technique (e.g., an LMS algorithm, an RLS algorithm, etc.). Similarly, in some other embodiments, server 150 may cancel the background sound in the voice communication based at least in part on the reference background sound. In such case, user devices 110 to 130 may receive, from server 150, the speech data in which the background sound has been canceled, upon completion of the cancellation.

Figure 2:
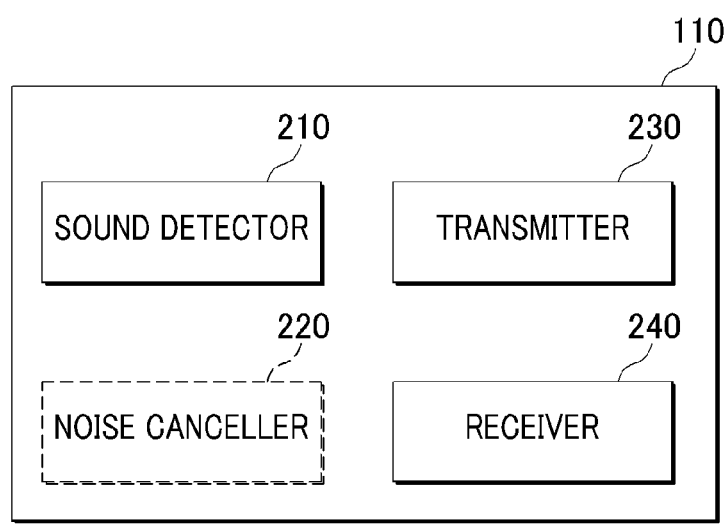
FIG. 2 schematically shows an illustrative example of a user device configured to capture a background sound in a voice communication, arranged in accordance with at least some embodiments described herein.

FIG. 2 schematically shows an illustrative example of a user device configured to capture a background sound in voice communication, arranged in accordance with at least some embodiments described herein. As illustrated in FIG. 2, user device 110 may include a sound detector 210, a transmitter 230 and a receiver 240, which may be implemented using any suitable hardware components, software components, firmware components, or any combination thereof.

Sound detector 210 may be configured to capture a background sound from an environment (e.g., ambient sound such as background noise/music) of user device 110 and/or speech from a user of user device 110. In some embodiments, sound detector 210 may include any suitable type of sound sensor(s) including one or more microphones and/or sound activity detectors. In some other embodiments, sound detector 210 may be further configured to convert the captured background sound and/or speech data into sound data in a compressed format such as MP3 (MPEG audio layer-3), WAV (waveform audio format), WMA (Windows media audio), AAC (advanced audio coding), etc. In some other embodiments, sound detector 210 may be further configured to convert the captured background sound and/or speech data into sound features such as LPC cepstrum coefficients, MFCCs, etc.

Transmitter 230 may be configured to transmit the captured background sound and/or speech data to server 150, via network 140. In some embodiments, transmitter 230 may transmit the captured background sound and/or speech/audio data in the form of at least one of raw sound data, sound data in a compressed format, and sound features (which may be represented in a vector form including one or more elements indicative of LPC cepstrum coefficients, MFCCs, etc.).

Receiver 240 may be configured to receive, from server 150, a reference background sound corresponding to the captured background sound, via network 140. In some embodiments, receiver 240 may receive, from server 150, the speech data in which the background sound has been cancelled using the reference background sound by a noise canceller in server 150 (e.g., noise canceller 360 in FIG. 3).

In some embodiments, user device 110 may optionally further include a noise canceller 220 configured to cancel the background sound in the voice communication (e.g., speech data) based at least in part on the reference background sound. In some examples, noise canceller 220 may cancel the background sound in the voice communication based at least in part on the reference background sound using an adaptive noise cancellation technique such as an LMS algorithm or an RLS algorithm.

In some embodiments, the above configuration of user device 110 described with reference to FIG. 2 may be similarly implemented in any one of user devices 110 to 130. In some other embodiments, any one of the elements of user devices 110 to 130 may be alternatively or additionally implemented in server 150.

Figure 3:
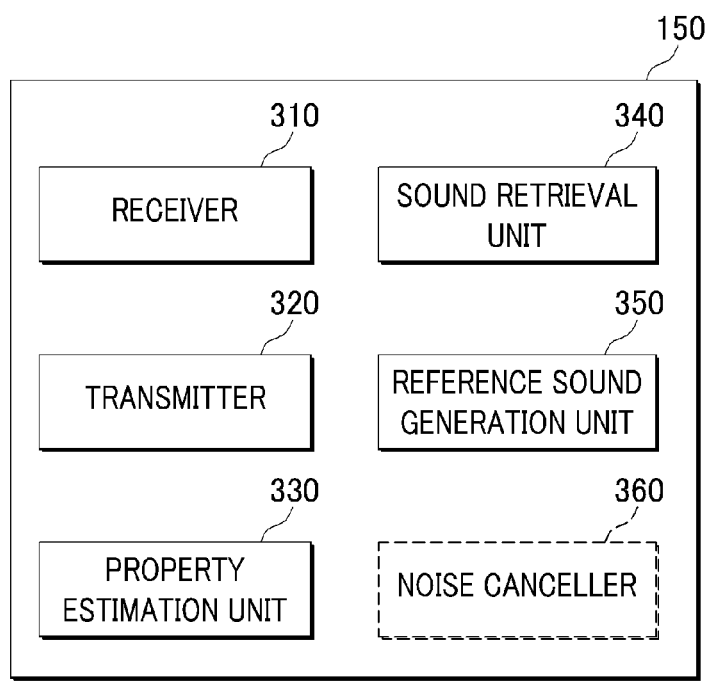
FIG. 3 shows a schematic block diagram illustrating an example architecture of a server for implementing a noise cancellation scheme, arranged in accordance with at least some embodiments described herein.

FIG. 3 shows a schematic block diagram illustrating an example architecture of a server for implementing a noise cancellation scheme, arranged in accordance with at least some embodiments described herein. As depicted, server 150 may include a receiver 310, a transmitter 320, a property estimation unit 330, a sound retrieval unit 340, and a reference sound generation unit 350, which may be implemented using hardware components, software components, firmware components, or any combination thereof.

Receiver 310 may be configured to receive speech/audio data as well as a background sound from any one of user devices 110 to 130, via network 140.

Property estimation unit 330 may be configured to estimate the properties of the received background sound using any type of channel estimation technique including, for example, a least-squire estimation, a minimum mean square error (MMSE) estimation, etc.

Sound retrieval unit 340 may be configured to identify a source of the background sound by comparing the received background sound to stored sounds that correspond to a plurality of predetermined sound sources. In some other embodiments, sound retrieval unit 340 may compare the received background sound to the stored sounds that correspond to the plurality of predetermined sound sources by comparing an audio fingerprint of the received background sound to audio fingerprints of the sounds corresponding to the plurality of predetermined sound sources. As referenced herein, an audio fingerprint may refer to perceptual characteristics of sound which can be used to identify or locate a source of the sound in a sound database including a plurality of predetermined sound sources. For example, the audio fingerprint may include at least one of average zero crossing rate, estimated tempo, average spectrum, etc. of the sound.

Reference sound generation unit 350 may be configured to generate (or reproduce) a reference background sound based at least in part on the identified source of the background sound (e.g., a sample sound associated with the identified source of the background sound). In some embodiments, reference sound generation unit 350 may generate the reference background sound by adjusting properties of a sound corresponding to the identified source based at least in part on properties of the background sound.

In some examples, the properties of the background sound may include at least one of a quality of sound and an impulse response. An impulse response may represent channel information from a source of a sound (e.g., a source of the background sound) to a sound sensor (e.g., sound detector 210 of user device 110). The sound captured by the sound sensor can be presented by a convolution form $x[n]=h[n]*s[n]$, where $x[n]$ indicates the captured sound, $s[n]$ indicates a source of the captured sound, $h[n]$ indicates the impulse response (which may represent characteristics of the source of the captured sound and the sound sensor), and "*" indicates a convolution operator. Assuming that $x[n]$ and $s[n]$ are known, server 150 (e.g., property estimation unit 330) may estimate $h[n]$ using any suitable channel estimation techniques.

Further, the quality of sound for the background sound, which is delivered from user device 110 to server 150, may be affected by sound detector 210 of user device 110, and the source of the background sound. Thus, the quality of sound for the background sound may be included in the impulse response estimated by server 150. Alternatively, the quality of sound for the background sound may be directly obtained from frequency spectrum of the background sound.

In some embodiments, server 150 may optionally further include a noise canceller 360 configured to cancel the background sound in the speech data based at least in part on the reference background sound. In some examples, the cancellation of the background sound in the speech may be performed by using any suitable adaptive noise cancellation technique, such as an LMS algorithm or an RLS algorithm, in which the reference background sound may be adaptively filtered and subtracted from the speech to estimate original speech corrupted by the background sound.

Transmitter 320 may be configured to transmit the reference background sound to any one of user devices 110 to 130 through network 140. In some embodiments, transmitter 320 may transmit the speech data, in which the background sound has been cancelled by noise canceller 360, to any one of user devices 110 to 130.

Figure 4:
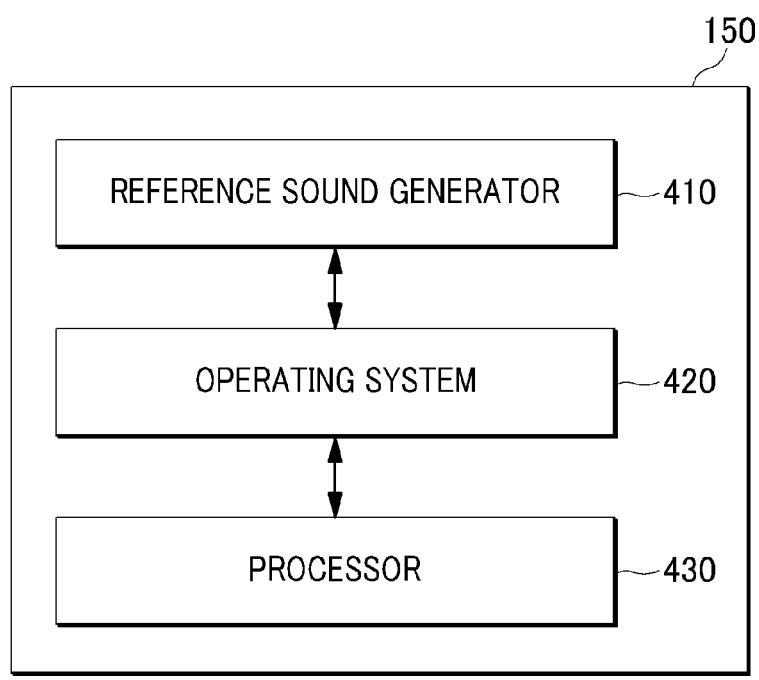
FIG. 4 shows a schematic block diagram illustrating another example architecture of a server for implementing a noise cancellation scheme, arranged in accordance with at least some embodiments described herein.

FIG. 4 shows a schematic block diagram illustrating another example architecture of a server for implementing a noise cancellation scheme, arranged in accordance with at least some embodiments described herein.

As depicted, server 150 (e.g., server 150 in FIGS. 1 and 3) may include a reference sound generator 410, an operating system 420, and a processor 430. Reference sound generator 410 may be software, a firmware or any combination thereof that is adapted to operate on operating system 420 such that the noise cancellation scheme as described herein may be implemented. Operating system 420 may allow reference sound generator 410 to manipulate processor 430 to implement the noise cancellation scheme as described herein.

Figure 5:
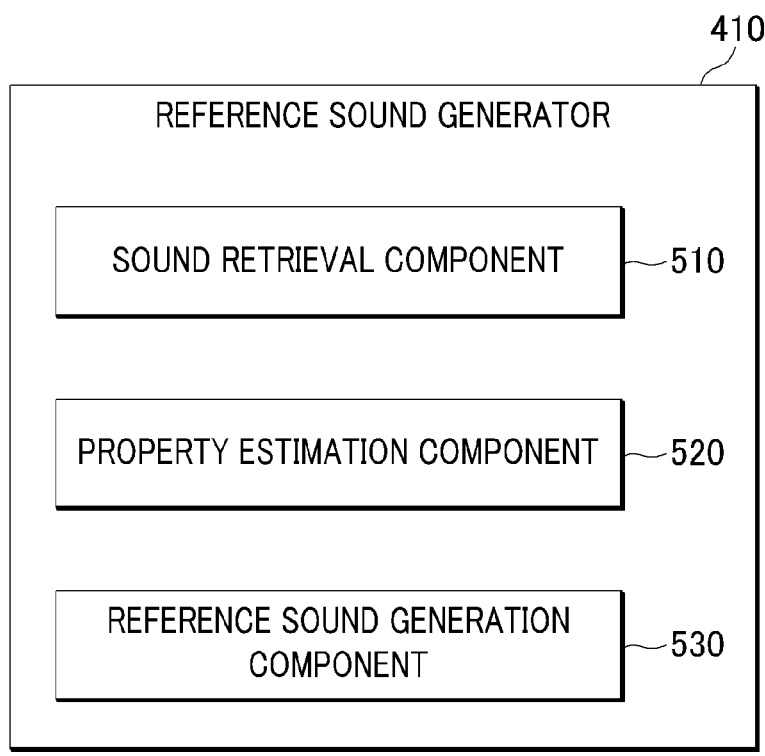
FIG. 5 shows a schematic block diagram illustrating an example architecture of a reference sound generator for implementing a noise cancellation scheme, arranged in accordance with at least some embodiments described herein.

FIG. 5 shows a schematic block diagram illustrating an example architecture of a reference sound generator for implementing a noise cancellation scheme, arranged in accordance with at least some embodiments described herein.

As depicted, reference sound generator 410 (e.g., reference sound generator 410 in FIG. 4) may include a sound retrieval component 510, a property estimation component 520, and a reference sound generation component 530, which may be implemented using hardware components, software components, firmware components, or any combination thereof.

Sound retrieval component 510 may be configured to identify a source of the background sound from among a plurality of predetermined sound sources. In some embodiments, sound retrieval component 510 may identify the source of the background sound by comparing the background sound to stored sounds corresponding to the plurality of predetermined sound sources to find a sound among the stored sounds having the greatest similarity to the background. In some other embodiments, sound retrieval component 510 may compare the background sound to the sounds corresponding to the plurality of predetermined sound sources by comparing an audio fingerprint of the background sound to audio fingerprints of the sounds corresponding to the plurality of predetermined sound sources.

Property estimation component 520 may be adapted to estimate the properties of the background sound using any suitable channel estimation technique (e.g., a least-squire estimation, an MMSE estimation, etc.).

Reference sound generation component 530 may be adapted to generate a reference background sound based at least in part on the identified source (e.g., a sample sound associated with the identified source of the background sound). As described above, the generated reference background sound may be used in cancelling the background sound from the speech data, which may be performed using an adaptive noise cancelling technique. In some embodiments, reference sound generation component 530 may generate the reference background sound by adjusting properties of a sound corresponding to the identified source based at least in part on properties of the background sound. In some examples, the properties of the background sound may include at least one of a quality of sound and an impulse response.

Figure 6:
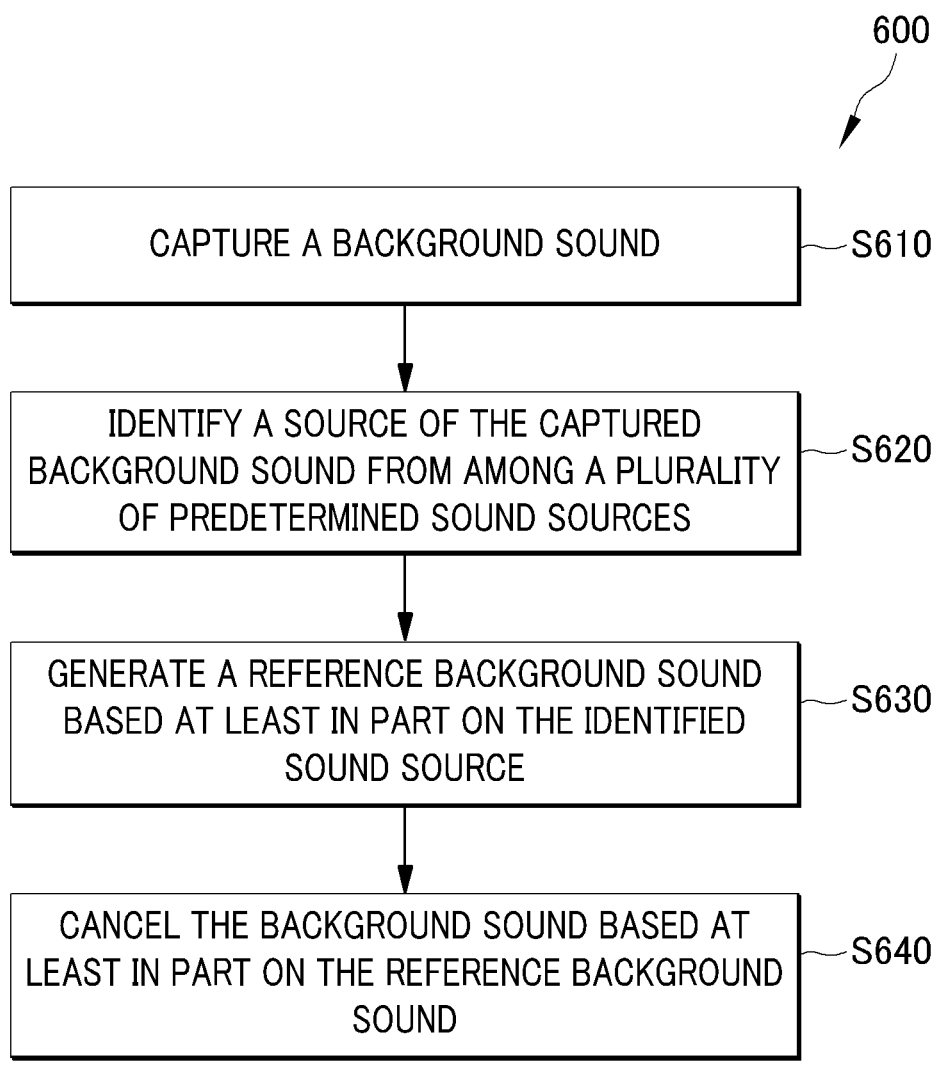
FIG. 6 shows an example flow diagram of a process for a system for implementing a noise cancellation scheme, arranged in accordance with at least some embodiments described herein.

FIG. 6 shows an example flow diagram of a process for a system for implementing a noise cancellation scheme, arranged in accordance with at least some embodiments described herein.

Process 600 may be implemented at least partially in a server such as server 150 (e.g., server 150 in FIGS. 1, 3 and 4) including property estimation unit 330, sound retrieval unit 340, reference sound generation unit 350, and/or noise canceller 360. Process 600 may also be implemented at least partially in a user device such as user device 110 including sound detector 210 and/or noise canceller 220. Further, process 600 may be implemented by computer programs or program modules that are configured, programmed, or otherwise designed to implement the noise cancellation scheme, and which are hosted by a server, such as reference sound generator 410; the aforementioned server may include sound retrieval component 510, property estimation component 520, and reference sound generation component 530. Process 600 may include one or more operations, actions, or functions as illustrated by one or more blocks S610, S620, S630 and/or S640. Although illustrated as discrete blocks, various blocks may be divided into additional blocks, combined into fewer blocks, or eliminated, depending on the desired implementation. Processing may begin at block 5910.

At block 5610 (Capture a Background Sound), user device 110, 120 or 130 (e.g., sound detector 210) may capture a background sound. For example, user device 110, 120 or 130 may capture a background sound when a voice call request signal is received as part of an incoming call or when the user device enters a call mode as part of an outgoing call. In some embodiments, any one of user devices 110, 120 or 130 may capture a background sound from an environment of the respective user device and/or speech from a user of the user device. In some other embodiments, any one of user devices 110, 120 or 130 may convert the captured background sound and/or speech data into sound data in a compressed format such as MP3, WAV, WMA, AAC, etc. In some other embodiments, any one of user devices 110, 120 or 130 may convert the captured background sound and/or speech data into sound features such as LPC cepstrum coefficients, MFCCs, etc. Processing may continue from block 5610 to block S620.

At block S620 (Identify a Source of the Captured Background Sound from among a Plurality of Predetermined Sound Sources), server 150 (e.g., sound retrieval unit 340) and/or reference sound generator 410 (e.g., sound retrieval component 510) may identify a source of the background sound from among a plurality of predetermined sound sources.

In some embodiments, server 150 and/or reference sound generator 410 may identify the source of the background sound by comparing the background sound to stored sounds that correspond to the plurality of predetermined sound sources. In some other embodiments, server 150 and/or reference sound generator 410 may compare the background sound to the stored sounds corresponding to the plurality of predetermined sound sources by comparing an audio fingerprint of the background sound to audio fingerprints of the sounds corresponding to the plurality of predetermined sound sources. The audio fingerprint of the background sound may represent perceptual characteristics of the background sound, including, e.g., at least one of average zero crossing rate, estimated tempo, average spectrum, etc. Processing may continue from block S620 to block S630.

At block S630 (Generate a Reference Background Sound based at least in part on the Identified Sound Source), server 150 (e.g., reference sound generation unit 350) and/or reference sound generator 410 (e.g., reference sound generation component 530) may generate (or reproduce) a reference background sound based at least in part on the identified source. In some embodiments, server 150 and/or reference sound generator 410 may generate the reference background sound by adjusting properties of a sound corresponding to the identified source based at least in part on properties of the background sound. Processing may continue from block S630 to block S640.

At block S640 (Cancel the Background Sound based at least in part on the Reference Background Sound), user device 110, 120 or 130 (e.g., noise canceller 220) and/or server 150 (e.g., noise canceller 360) may cancel the background sound in the voice communication (e.g., speech data) based at least in part on the reference background sound. In some embodiments, user device 110, 120 or 130 and/or server 150 may perform the cancellation of the background sound in the speech data by using an adaptive noise cancellation technique, such as an LMS algorithm or an RLS algorithm, in which the reference background sound may be adaptively filtered and subtracted from the speech data to estimate original speech corrupted by the background sound.

One skilled in the art will appreciate that, for this and other processes and methods disclosed herein, the operations performed in the processes and methods may be implemented in differing order. Furthermore, the outlined operations are only provided as examples, and some of the operations may be optional, combined into fewer steps and operations, or expanded into additional steps and operations without detracting from the essence of the disclosed embodiments.

Figure 7:
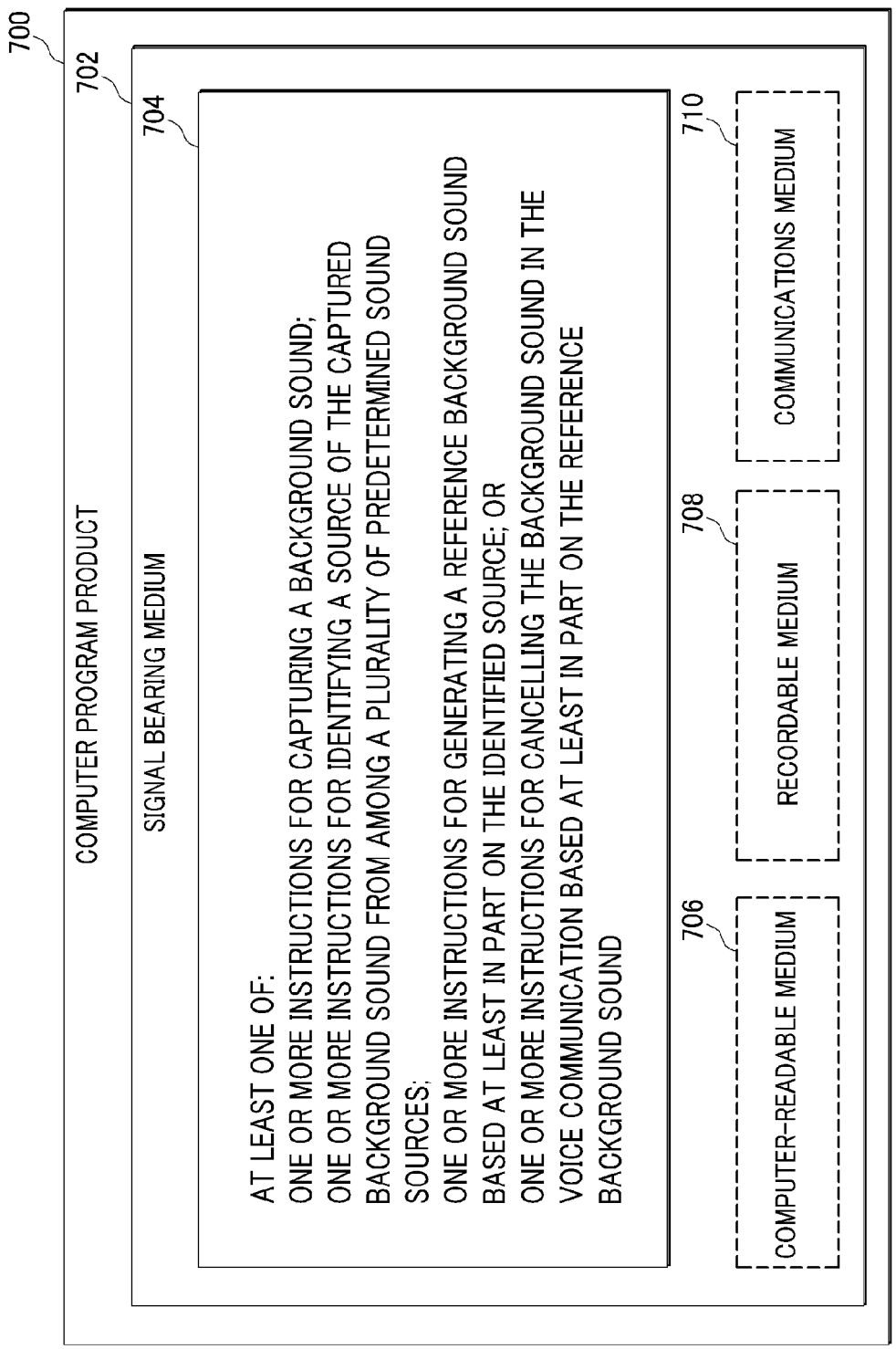
FIG. 7 illustrates an example computer program product that may be utilized to implement a noise cancellation scheme, arranged in accordance with at least some embodiments described herein.

FIG. 7 illustrates an example computer program product that may be utilized to implement a noise cancellation scheme, arranged in accordance with at least some embodiments described herein.

Computer program product 700 may be hosted by a user device (e.g., user device 110, 120 or 130), a server (e.g., server 150 and/or reference sound generator 410). As depicted, computer program product 700 may include a signal bearing medium 702. Signal bearing medium 702 may include one or more instructions 704 that, when executed by, for example, a processor, may provide the functionality described above with respect to FIGS. 1-6. By way of example, instructions 704 may include at least one of: one or more instructions for capturing a background sound; one or more instructions for identifying a source of the captured background sound from among a plurality of predetermined sound sources; one or more instructions for generating a reference background sound based at least in part on the identified source; or one or more instructions for cancelling the background sound in the voice communication based at least in part on the reference background sound. Thus, for example, referring to FIGS. 1-5, user device 110, 120 or 130, server 150 and/or reference sound generator 410 may undertake one or more of the blocks shown in FIG. 6 in response to instructions 704.

In some implementations, signal bearing medium 702 may encompass a computer-readable medium 706, such as, but not limited to, a hard disk drive (HDD), a compact disc (CD), a digital versatile disc (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communication link, a wireless communication link, etc.). Thus, for example, computer program product 700 may be conveyed to one or more modules of user device 110, 120 or 130, server 150 and/or reference sound generator 410 by an RF signal bearing medium 702, where the signal bearing medium 702 is conveyed by a wireless communications medium 710 (e.g., a wireless communications medium conforming with the IEEE 802.11 standard).

Figure 8:
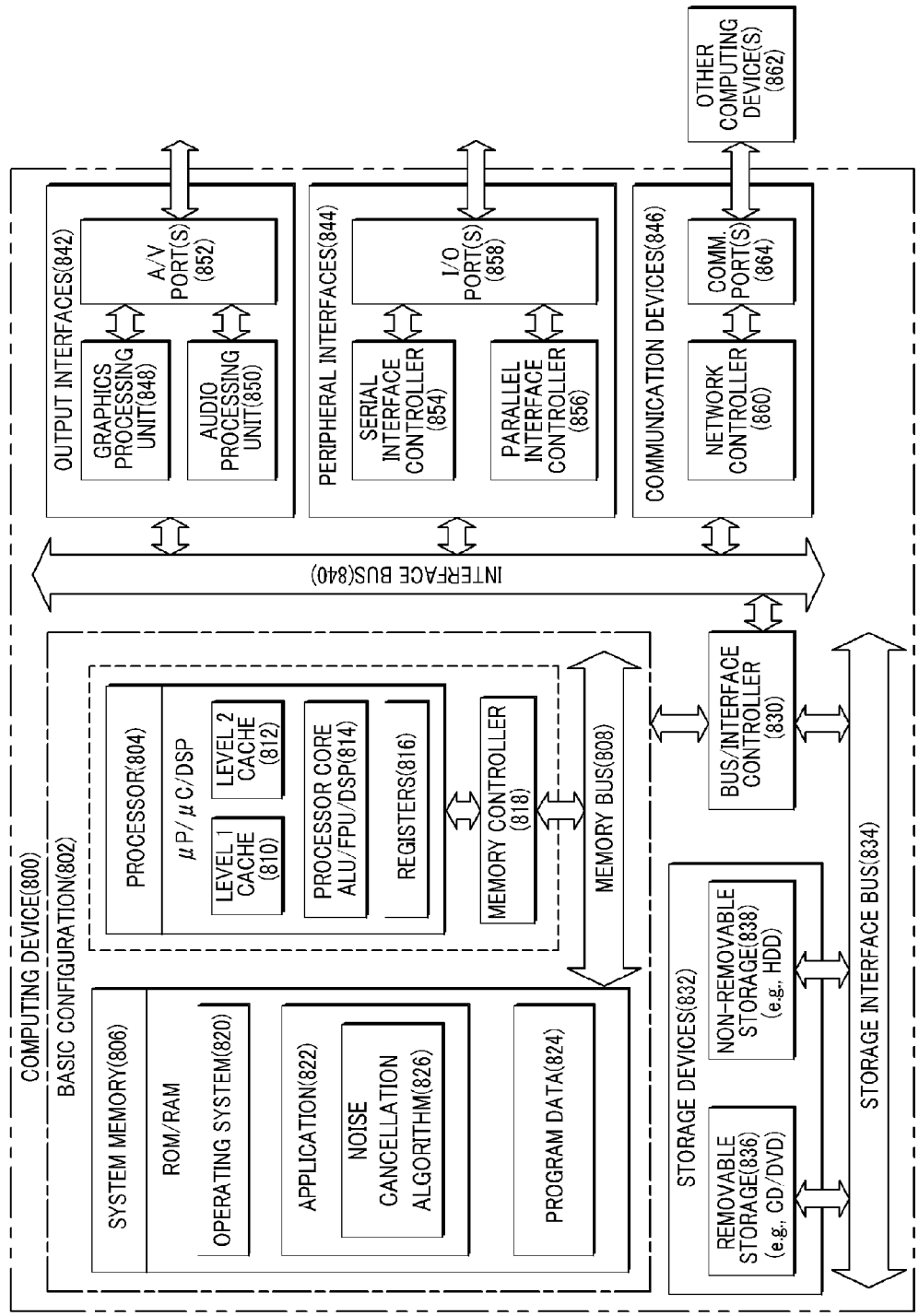
FIG. 8 is a block diagram illustrating an example computing device that may be utilized to implement a noise cancellation scheme, arranged in accordance with at least some embodiments described herein.

FIG. 8 is a block diagram illustrating an example computing device that may be utilized to implement a noise cancellation scheme, arranged in accordance with at least some embodiments described herein.

In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (μP), a microcontroller (μC), a digital signal processor (DSP), or any combination thereof. Processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), nonvolatile memory (such as ROM, flash memory, etc.) or any combination thereof. System memory 806 may include an operating system 820, one or more applications 822, and program data 824.

Application 822 may include a noise cancellation algorithm 826 that may be arranged to perform the functions as described herein including the actions described with respect to the user device 110 to 130 or server 150 architecture as shown in FIGS. 2-5 or including the actions described with respect to the flow charts shown in FIG. 6. Program data 824 may include any data that may be useful for providing the noise cancellation scheme as is described herein. In some examples, application 822 may be arranged to operate with program data 824 on an operating system 820 such that the noise cancellation scheme as described herein may be provided.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system configured to cancel background noise in voice communication, the system comprising:
    a user device configured to capture a background sound in the voice communication; and
    a server configured to:
        receive the background sound captured by the user device;
        identify a source of the background sound from among a plurality of sound sources;
        generate a reference background sound by adjustment of a sound corresponding to the identified source based on a quality of sound for the background sound and an impulse response of the identified source, wherein the impulse response represents channel information of a channel from the source of the background sound to a sound detector of the user device; and
        cancel the background sound in the voice communication based at least in part on the generated reference background sound.

2. The system of claim 1, wherein the user device is further configured to cancel the background sound in the voice communication based at least in part on the generated reference background sound.

3. The system of claim 1, further comprising:
    another user device configured to participate in the voice communication and cancel the background sound in the voice communication based at least in part on the generated reference background sound.

4. The system of claim 1, wherein the user device is configured to capture the background sound in an absence of a voice signal from a user of the user device, after a voice call request signal is received as part of an incoming call or after the user device enters a call mode as part of an outgoing call.

5. The system of claim 1, wherein the server is configured to identify the source of the background sound by comparison of the background sound to sounds corresponding to the plurality of sound sources.

6. The system of claim 5, wherein the server is configured to compare the background sound to the sounds corresponding to the plurality of sound sources by comparison of an audio fingerprint of the background sound to audio fingerprints of the sounds corresponding to the plurality of sound sources.

7. The system of claim 1, wherein the server is further configured to estimate properties of the captured background sound by use of a channel estimation technique.

8. The system of claim 1, wherein the user device is further configured to cancel the background sound based at least in part on the generated reference background sound by use of an adaptive noise cancellation technique.

9. A server, comprising:
    a receiver configured to receive a background sound from a user device;
    a sound retrieval unit configured to identify a source of the background sound from among a plurality of sound sources by comparison of the background sound to sounds corresponding to the plurality of sound sources;
    a reference sound generation unit configured to generate a reference background sound by adjustment of a sound corresponding to the identified source based on a quality of sound for the background sound and an impulse response of the identified source, wherein the impulse response represents channel information of a channel from the source of the background sound to a sound detector of the user device;
    a transmitter configured to transmit the reference background sound to the user device; and
    a noise canceller configured to cancel the background sound in a voice communication based at least in part on the generated reference background sound.

10. The server of claim 9, wherein the sound retrieval unit is configured to compare the background sound to the sounds corresponding to the plurality of sound sources by comparison of an audio fingerprint of the background sound to audio fingerprints of the sounds corresponding to the plurality of sound sources.

11. The server of claim 9, further comprising, a property estimation unit configured to estimate properties of the background sound by use of a channel estimation technique.

12. A server method to cancel background noise in voice communication, the method comprising:
    receiving, by a server from a user device, a background sound in the voice communication;
    identifying, by the server, a source of the received background sound from among a plurality of sound sources;

generating, by the server, a reference background sound by adjusting a sound corresponding to the identified source based on a quality of sound and an impulse response of the identified sound source, wherein the impulse response represents channel information of a channel from the source of the background sound to a sound detector of the user device; and cancelling, by the server, the background sound in the voice communication based at least in part on the generated reference background sound.

13. The method of claim 12, wherein the receiving the background sound includes receiving the background sound captured by the user device in an absence of a voice signal from a user of the user device, after a voice call request signal is received as part of an incoming call or after the user device enters a call mode as part of an outgoing call.

14. The method of claim 12, wherein the identifying the source of the received background sound includes comparing the received background sound to sounds corresponding to the plurality of sound sources.

15. The method of claim 14, wherein the comparing the received background sound to the sounds corresponding to the plurality of sound sources includes comparing an audio fingerprint of the received background sound to audio fingerprints of the sounds corresponding to the plurality of sound sources.

16. The method of claim 12, wherein the generating the reference background sound includes estimating the properties of the received background sound using a channel estimation technique.

17. The method of claim 12, wherein the cancelling the background sound includes cancelling the background sound based at least in part on the reference background sound using an adaptive noise cancellation technique.

18. A server-based non-transitory computer-readable storage medium which stores a program to cause a processor to cancel or control cancellation of background noise for voice communication, the program comprising one or more instructions to perform operations that comprise:

identifying, by a server, a background sound received from a user device and present in the voice communication;

identifying, by the server, a source of the identified background sound from among a plurality of sound sources;

generating, by the server, a reference background sound by adjusting a sound corresponding to the identified source based on a quality of sound for the background sound and an impulse response of the identified source, wherein the impulse response represents channel information of a channel from the source of the background sound to a sound detector of the user device; and cancelling, by the server, the background sound in the voice communication based at least in part on the reference background sound.

\* \* \* \* \*